Aug. 23, 1949.  E. R. HABERLAND  2,479,566
CHOPPER FOR ELECTRICAL CIRCUITS
Filed July 13, 1945  2 Sheets-Sheet 1

Inventor.
E. R. HABERLAND
By Ralph Chappell
Attorney

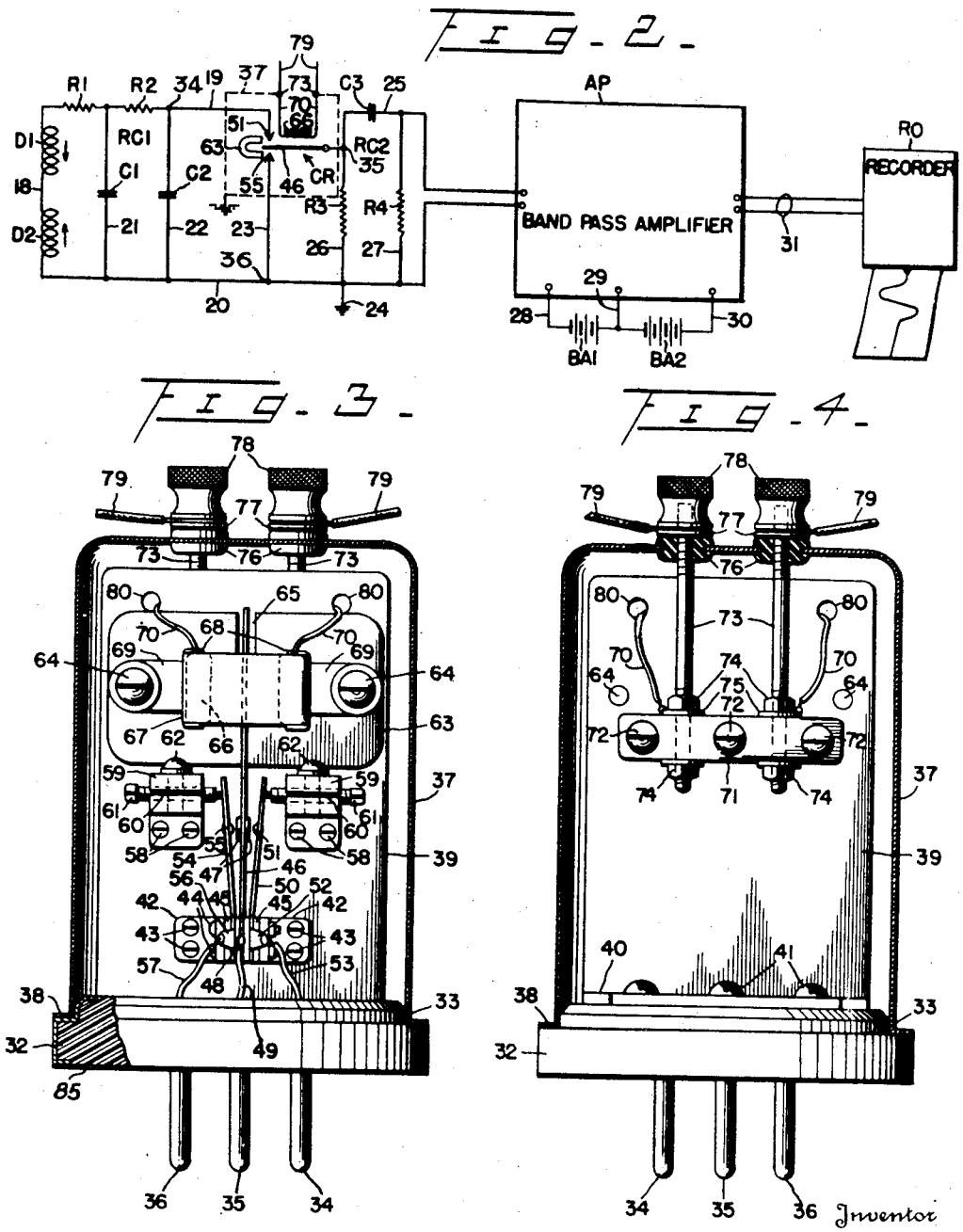

Patented Aug. 23, 1949

2,479,566

UNITED STATES PATENT OFFICE 2,479,566

CHOPPER FOR ELECTRICAL CIRCUITS

Ernest R. Haberland, Washington, D. C.

Application July 13, 1945, Serial No. 604,946

2 Claims. (Cl. 200—90)

(Granted under the act of March 3, 1883, as amended April 30, 1928; 370 O. G. 757)

This invention relates to a new and improved chopper for use in electrical circuits for converting low frequency currents into electrical impulses of higher frequency. The term chopper, as used herein, refers to any type of electrically driven circuit interrupter suitable for use in detection circuits having means therein adapted to generate low frequency, low amplitude voltages corresponding to the aforesaid low frequency currents.

More specifically this invention relates to means for preventing electrical leakage between the input and output circuits of such a chopper.

The chopper of the present invention is well suited, although obviously not limited, to use in the detecting circuit disclosed in the co-pending application of Haberland et al., for Electronic fluxmeter and A. C. amplifier, Serial No. 624,620, filed October 25, 1945, this circuit being used primarily for detecting the presence of ferro-magnetic masses, depth charges, mines, ships, and torpedoes submerged in the water.

It is an object of the present invention to provide a chopper that will have minimum current leakage between the driver coil and the chopper contact circuit.

Another object is to provide a new and improved detection circuit in which spurious leakage voltages of high frequency originating from the chopper driving source are prevented from obscuring small voltages of relatively low frequency and amplitude generated by a high impedance detector.

It is a further object of the present invention to provide an improved mounting means for the terminals of the driver coil circuit in a chopper, so that the latter are spaced as far as possible from the terminals of the chopping circuit consistent with the physical dimensions of the device.

An additional object is to arrange the chopper and driver coil terminals in widely spaced relation and to provide a rigid mounting for the coil terminals independently of the casing for the chopper whereby the casing may be removed without disconnecting the coil leads from the terminals therefor.

Still other objects, advantages and improvements will be apparent from the following description, taken in connection with the accompanying drawings, in which:

Fig. 1 shows a vessel 10, such as a trawler, moving through the water and drawing a detecting device 11, by cables 12—13; a mine 17 rests on the bottom of the body of water.

Fig. 2 shows a circuit comprising two identical gradiometer coils D—1 and D—2, a filter circuit RC—1, the chopper CR, a coupling circuit RC—2, a band pass amplifier AP, and a recorder RO.

Fig. 3 is a view in end elevation of the chopper, the casing being shown in section to expose the internal parts;

Fig. 4 is a view similar to Fig. 3 but showing the reverse side of the chopper, the casing again being shown in section.

Figure 1:
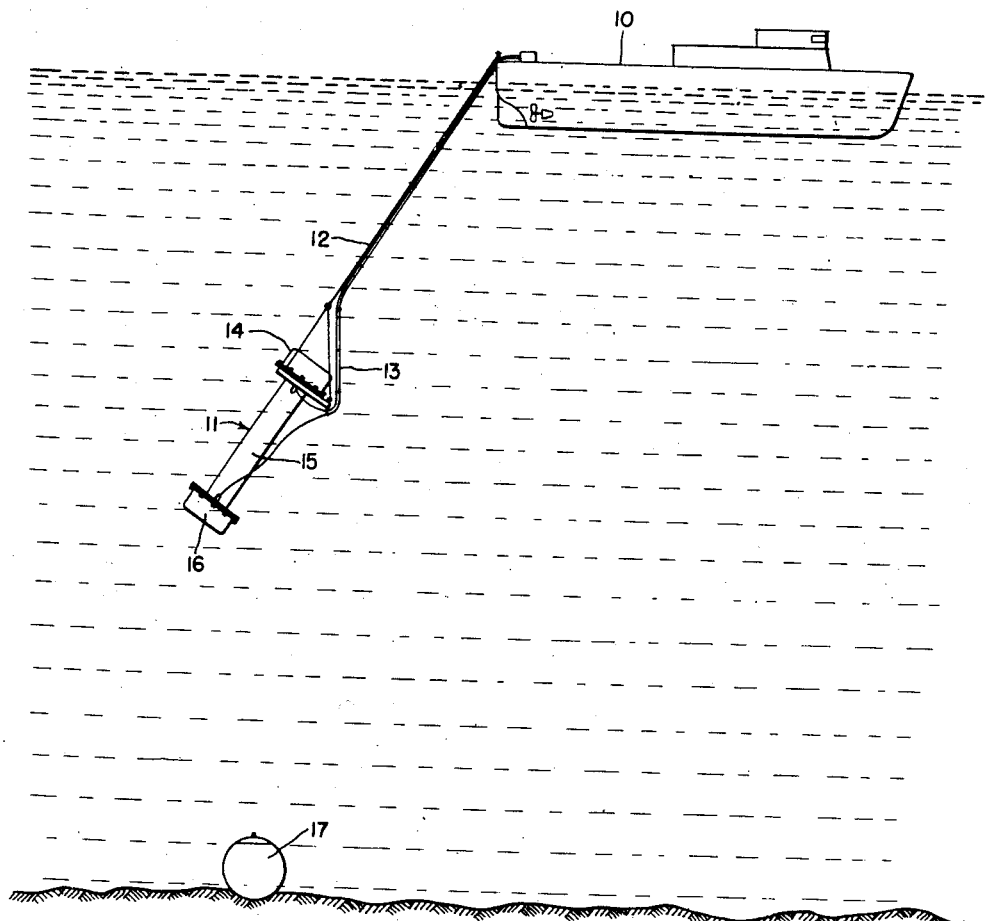

Referring now to the drawings, and more particularly to Fig. 1, it will be seen that the detecting device 11 is connected to the vessel 10 by a supporting cable 12 and a transmission cable 13. The detecting device comprises two enlarged end caps 14 and 16 composed of non-magnetic material and rigidly supported at either end of an elongated hub 15 in mutually parallel spaced relation. The end cap 14 encloses the gradiometer coil D—1 and the end cap 16 the gradiometer coil D—2. One conductor of the transmission cable 13 is connected to the gradiometer coil D—1 and the other conductor to the gradiometer coil D—2; the two coils are connected in series opposition by a conductor 18 (Fig. 2) which passes through the elongated hub 15. The gradiometer coils D—1 and D—2 comprise the same number of turns of wire and are connected such that they are in inductive opposition to each other, as indicated by the arrows on Fig. 2, and thus the detecting device 11 is unresponsive to angular motion of the device relative to the undistorted terrestrial magnetic field. The elongated hub 15, which mounts the end caps 14 and 16 and thus physically separates the gradiometer coils D—1 and D—2, is made of some suitable diamagnetic material, preferably brass.

It is well known that a steel vessel has an inherent magnetic field of its own. The same is true of depth charges, mines, or torpedoes, which latter after spending their propelling force without exploding will sink to the bottom of the body of water. In any event, a vessel, depth charge, mine or torpedo resting on the bed of the body of water will, in addition to having its own inherent magnetic field, distort the ambient magnetic field of the earth and thus it will readily be seen that the presence of such metallic masses on the bottom of the body of water can be detected by the use of some apparatus, responsive to slight abnormalities in the ambient magnetic field, such as the differentially wound gradiometer coils D—1 and D—2.

One terminal of the gradiometer coil D—1 is connected by a conductor 19 to one fixed contact 51 of the chopper CR of the present invention. A conductor 20 extends from one terminal of the gradiometer coil D—2 to one input terminal of the band pass amplifier AP; as previously stated, the adjacent terminals of the gradiometer coils D—1 and D—2 are connected together by a conductor 18 (Fig. 2). Choppers of the type used here are usually fed with current of sixty (60) cycle frequency supplied from a generator (not shown) on the trawler. It is desirable that any sixty cycle impulses induced in the gradiometer coils D—1 and D—2 be filtered from the output of these coils. For this purpose a resistance-capacity filter RC—1 is provided. This filter circuit consists of two resistors R—1 and R—2 in series in the conductor 19, a capacitor C—1 bridged by a conductor 21 between the conductor 19, at the juncture of the resistors R—1 and R—2, and the conductor 20, and a second capacitor C—2 bridged by a conductor 22 between the conductor 19, at the outer terminal of the resistor R—2, and the conductor 20. With a sixty cycle input to the chopper CR and values for the gradiometer coils D—1 and D—2 of 300 to 400 henries each, values of 100,000 ohms for the resistors R—1 and R—2 and 8 micro-farads for the capacitors C—1 and C—2 have been found satisfactory.

The chopper CR will be further described in detail hereinafter. Briefly it consists of an input or exciter coil 66, a resilient armature 46, and two fixed contacts 51 and 55, mounted one on either side of the armature. The input coil 66 is connected to a suitable source of alternating current at the desired frequency by conductors 70—70. As previously stated, the conductor 19 from the gradiometer coil D—1 and the filter circuit RC—1 terminates at the contact 51 of the chopper. The other contact 55 of the chopper is connected by a conductor 23 to the conductor 20 extending from the gradiometer coil D—2 and the filter circuit RC—1 to one input terminal of the band pass amplifier AP. A ground connection 24 is placed on the conductor 20 at the junction of the latter with the conductor 20. The armature 46 is connected by a conductor 25 to the other input terminal of the band pass amplifier AP.

A resistance-capacity coupling circuit RC—2 is provided for connecting the chopper CR and the gradiometer coils D—1 and D—2 and filter circuit RC—1 to the band pass amplifier AP. This circuit consists of a capacitor C—4 interposed in the conductor 25 intermediate the armature 46 of the chopper CR and the input terminal of the amplifier AP, a resistor R—3 bridged by a conductor 26 across the conductor 21, intermediate the armature 46 and the capacitor C—3, and the conductor 20, and a resistor R—4 bridged by a conductor 27 across the conductor 25, intermediate the capacitor C—3 and the input terminal of the amplifier AP, and the conductor 20. Values of one-tenth micro-farad for the capacitor C—3 and one megohm each for the resistors R—3 and R—4 have been found satisfactory.

The band pass amplifier AP is designed to pass a current of one frequency only, for instance sixty cycles. A battery BA—1 is connected to the band pass amplifier AP by conductors 28 and 29 and supplies filament current for the vacuum tubes of the amplifier; likewise, a battery BA—2 is connected to the amplifier AP by conductors 29 and 30 and supplies plate current for the vacuum tubes.

The output terminals of the band pass amplifier AP are connected by conductors 31 to a recorder RO. This latter may comprise a micro-ammeter but it is preferably one of the well known commercial recording devices which rules a graphic line on previously prepared cross-section paper passing through the recorder.

Figure 5:
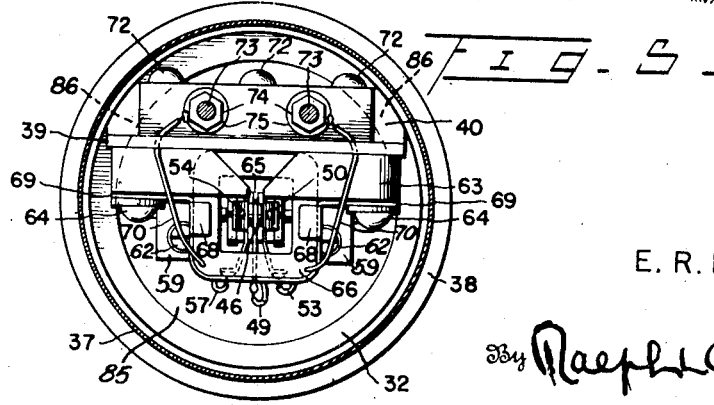
Fig. 5 shows a top plan view of the chopper with the casing cut away to expose the internal parts.

Referring now to Figs. 3, 4 and 5 it will be seen that the chopper CR comprises a base disc 85, made of electrical insulation material such, for example, as one of the well known phenolic condensation products, which has formed thereon a shoulder 33. In the chopper of the present invention three pins 34—35—36 extend through the base disc in tight fitting relationship therein. A cover 37 comprises a casing enclosing the working parts of the chopper, this cover having an outwardly extending bottom flange 38 which is in close fitting relationship and electrical engagement with the shoulder 33 on the peripheral metallic ring member 32 surrounding base disc 85.

The internal parts of the chopper CR are mounted on a plate 39 which has a toe flange 40 secured to the base disc 85, as by screws 41 and arranged in overlying electrical engagement with ring member 32 as at 86. Slightly above the base disc 85 there is mounted on the plate 39 a pair of aligned angle brackets 42—42 secured to the mounting plate 39 by screws 43. Screws 44 with suitable nuts thereon extend through aligned holes in the outwardly extending flanges of the angle brackets 42—42. (It will be understood that the screws 44 are insulated from each other and from the mounting 39 by suitable insulating bushings which extend from the heads of the screws to the nuts thereon, these bushings not being shown on the drawing.) Positioned between the outwardly extending flanges of the angle brackets 42—42 and on the screws 44 there is a plurality (four) of insulating washers 45. Intermediate the second and third insulating washers 45—45 the butt of the armature 46 is mounted on the screws 44 and the insulating bushings carried thereby.

The armature 46 is made of any suitable material having the requisite degree of resiliency and high magnetic permeability, preferably spring steel, for a purpose which will appear hereinafter. Attached to the armature 46 in any suitable manner on either side thereof and positioned slightly below the mid-section thereof, there is a pair of contacts 47—47 composed preferably of platinum-iridium alloy. An integral connector lug 48 is formed on the butt of the armature 46 and a conductor 49 is attached to this connector lug and to the middle pin 35, extending through the base disc 32. Similarly, intermediate the first and second insulating washers 45—45, and again on the insulating bushings carried by the screws 44—44, the butt of a fixed spring contact member 50 is mounted. This fixed spring contact member has a contact 51 secured thereto in any suitable manner, this contact being positioned about two-thirds of the length from the bottom and in alignment with the contacts 47—47 carried by the armature 46. The contact 51 is also preferably made of platinum-iridium alloy. An integral connector lug 52 is formed on the butt of the fixed spring contact member 50 and a conductor 53 is attached to this connector lug and to the pin 34 extending through the base disc 85.

Likewise, intermediate the third and fourth insulating washers 45—45, and also on the insulating bushings carried by the screws 44—44, the butt of a second fixed spring contact member 54 is mounted, this fixed spring contact member being positioned on the opposite side of the armature 46 from the first fixed spring contact member 50. The second fixed spring contact member 54 also has a contact 55 secured thereto in any suitable manner, this contact being likewise positioned about two-thirds of the length from the bottom and in alignment with the contacts 47—47 mounted on the armature 46 and the contact 51 mounted on the opposite fixed spring contact member 50, when the armature 46 and the fixed spring contact members 50 and 54 are in assembled relationship. The contact 55, like the contacts 47—47 and 51, is also preferably made of platinum-iridium alloy. As before, an integral connector lug 56 is formed on the butt of the fixed spring contact member 54 and a conductor 57 is attached to this connector lug and to the pin 36 extending through the base disc 35.

Mounted on the plate 39 above the aligned contacts 47—51—55 and attached to this plate by screws 58 there is a pair of aligned bracket members 59—59, these being positioned on either side of the armature 46. Each of these bracket members is slotted longitudinally at 60 and a threaded hole is formed longitudinally through each bracket member on the center plane of the slot. Set screws 61—61 are mounted in these holes in the bracket members 59—59, respectively, and these set screws are aligned with and abut the upper ends of the fixed spring contact members 50 and 54, respectively. The set screws 61—61 function as adjustment means for determining the positions of the fixed spring contact members 50 and 54 and the contacts 51 and 55, respectively, carried thereby with respect to the contacts 47—47 carried by the intermediate armature 46. Locking screws 62—62 pass freely through suitable holes in the upper partially severed portions of the bracket members 59—59 and are received in threaded continuations of these holes in the lower portions of these bracket members. Bracket members 59—59 and screws 58 are arranged in electrical engagement with plate 39, and one of set screws 61 is arranged in electrical engagement with bracket member 59 and spring contact member 54, thereby to connect the ring member 32, casing 37 and plate 39 to the grounded terminal prong 36. Set screw 61, in engagement with spring contact member 50, however, is insulated therefrom in the usual manner.

Above the bracket members 59—59 a C-shaped permanent magnet 63 is secured in flat relationship on the mounting plate 39 by screws 64—64, this magnet preferably being made of the magnetic alloy known commercially as "Alnico." The uppermost leg of the C-shaped permanent magnet 63 has the gap 65 therein. As best shown in Fig. 5, this gap is triangular in shape cross-wise of the leg of the magnet adjacent the mounting plate 39 and this triangular portion merges into a rectangular portion adjacent to the outer face of the magnet. Obviously the magnetic flux lines will be concentrated in the rectangular portion of the air gap, that is the portion of the air gap of least reluctance. The armature 46 extends upwardly past the top-most leg of the C-shaped permanent magnet 63 and sweeps past the rectangular portion of the gap 65 in this leg during each vibrational swing thereof.

A coil 66 is preferably rectangular in cross-section and formed in square shape. This coil is secured to the mounting plate 39 by a bracket 67 which is held in place by the screws 64—64 which also holds the C-shaped permanent magnet 63 to the mounting plate. The bracket 67 is generally U-shaped and the U-shaped legs of the bracket have integral lugs 68 bent at ninety degrees (90°), these lugs holding the coil 66 in place. Also, the bracket 67 has outwardly extending toe flanges 69—69 through which the mounting screws 64—64 extend. In the assembled relationship, the armature 46 is positioned in its center or rest position along the vertical axis of the coil 66 and vibrates in a plane parallel to the sides of the coil, as shown in Fig. 3, and bisecting the ends of the coil.

It will be readily seen that if alternating current is passed through the coil 66, the free end of the armature 46 will be alternately magnetized and thus attracted and repelled alternately by the poles of the permanent magnet 63. By this arrangement the armature 46 oscillates at the frequency of the current through the coil 66.

Conductors 70—70 extend from the exciter coil 66 through holes 80 in the mounting plate 39.

In the chopper arrangements of the prior art the conductors 70—70 have been extended to two (2) additional pins, similar to the pins 34—35—36 in the base disc 85, and adjacent to these latter pins. However, moisture has been found to collect on the bottom of the base disc 85, thereby reducing the insulating resistance of same, and in the said devices of the prior art a potential of approximately three volts has been found to exist across the pins to which the conductors 70—70 were connected, that is across the resistor R—3, as a result of this leakage potential between the pins. Since the output potential of the gradiometer coils D—1 and D—2 is only a few milli-volts, the existence of this leakage potential has been found to disrupt the operation of the apparatus. This disadvantage of the prior art devices is obviated in the chopper of the instant invention by bringing the conductors 70—70 out through the top of the casing 37 and in this manner they are as widely separated as possible within the limits of the physical dimensions of the device, from the pins 34—35—36 in the base disc 85 to which the contact 51, armature 46, and the contact 55, respectively, are connected. Also in the chopper of the present invention, the casing 37 functions as a shielding means between the conductors 70—70 from the exciter coil 66 and the pins 34—35—36 in the base disc 85, this casing being grounded as aforesaid, to terminal prong 36 in the manner of the usual construction of such devices.

It is desired, in addition to bringing the conductors 70—70 out through the top of casing 37, as aforestated, that the terminals for the conductors be rigidly mounted on plate 39 whereby the casing may be removed from the chopper without requiring that the coil conductors be disconnected from the terminals therefor. Referring now to Fig. 4, it will be seen that a mounting structure is provided which satisfies this requirement. A terminal block 71 of insulating material is secured on the reverse side of the mounting plate 39 by screws 72, this block being positioned slightly below the screws 64—64 which hold the C-shaped permanent magnet 63 in place on the other side of the mounting plate. Conductor rods 73—73 extend through the top of the casing 37 and are threaded at both their upper and lower ends, the lower ends passing freely through suitable holes in the insulating block 71. Nuts 74—74 are mounted in face-to-face relationship on the lower threaded ends of the conductor rods 73—73 on the opposite sides of the insulating block 71, a washer 75 being interposed between each nut 74 and the block. The conductors 70—70 extending from the coil 66 are attached, respectively, to the washers 75—75 on the upper side of the insulating block 71, as by soldering. The conductor rods 73—73 extend through grommets 76—76, respectively, mounted in suitable holes in the top of the casing 37 and disc nuts 77—77 are mounted on the conductor rods in abutting relationship with these grommets. Knurled binding post nuts 78—78 mounted on the tops of the conductor rods 73—73 respectively, complete the assembly. Continuation conductors 79—79 have their terminals gripped between the disc nuts 77—77 and the binding post nuts 78—78, respectively, and these conductors extend to the generator or other alternating power supply (not shown) for the coil 66.

The operation of the chopper of the present invention in connection with the circuit disclosed should be readily apparent from the preceding description of the circuit arrangement and structure of the chopper. It may, however, be briefly summarized as follows: The detecting device 11 is towed through the water by the vessel 10, the chopper CR being continually excited from a suitable source of alternating current, preferably of sixty cycle frequency, on the towing vessel. As the detecting device 11 traverses the earth's undistorted magnetic field, which is quite uniform for a given area, the electro-motive forces induced in the differentially wound gradiometer coils D—1 and D—2 will be equal and will counterbalance each other and there will be no disturbance in either the filter circuit RC—1 or the the coupling circuit RC—2. However, should the detecting device 11 pass in the vicinity of a submerged metallic mass, such as a depth charge, submarine, torpedo, or mine 17, as shown, the earth's field being distorted in this vicinity, would induct in the gradiometer coils D—1 and D—2 electromotive forces of different strength and thus unbalance the inductive reactance of the coils.

The difference in the electro-motive forces generated in the gradiometer coils D—1 and D—2 will cause a current to flow in the filter circuit RC—1 which circuit, as previously stated, eliminates the stray currents induced in the gradiometer coils by the sixty cycle power supply for the chopper CR. The current resulting from the unbalanced electromotive forces in the gradiometer coils D—1 and D—2 will rise slowly to a maximum as the detecting device 11 passes into the portion of the magnetic field of greatest distortion and then decay as the detecting device passes out of the distorted magnetic field into the normal earth's field surrounding the instant area. However, for all practical purposes, this current may be considered a steady state current and such current would be of no use for operating a receiver, such as the recorder RO. The chopper CR breaks this current up into a pulsating electromotive force which is transmitted by the resistance-capacity coupling circuit RC—2 to the band pass amplifier AP. The resistor R—3 and the ground connection 24 hold the potential of the armature 46 of the chopper CR to ground when the armature engages contact 55 and no signal is being received from the gradiometer coils D—1 and D—2; the capacitor C—3 is a blocking capacitor for keeping any direct output potential of the chopper CR off the grid of the first stage vacuum tube (not shown) in the band pass amplifier AP; and the resistor R—4 operates as a grid leak for the first stage vacuum tube in the amplifier. The band pass amplifier AP selects a narrow frequency band, in this case around sixty cycles, converts this to direct current, integrates the direct current wave with respect to time, and transmits the integrated wave to the recorder RO which records same.

The aforedescribed mounting of the driving coil and chopper contact terminals in widely spaced and electrically insulated relation at their respective points of emergence from the casing 37 and base 32 substantially prevents leakage of current from the driving source to the chopper contact terminals, which leakage otherwise would obscure the signal voltage appearing at the contact terminals. Moreover, by reason of the grounding of the casing, the signal voltage and the driving coil voltage are both above ground potential, and if leakage paths develop between the casing and the coil and chopper contact terminals, the signal and driving coil voltages each will cause leakage currents to flow to ground rather than between the terminals.

Capacitive coupling between the coil driving circuit and the signal circuit is present to some extent due to the relatively high frequency of the coil driving current. Leakage of current into the signal circuit and resultant distortion of the signal due to this coupling, however, is substantially reduced in the interrupter switch arrangement of the present invention by reason of the wide spacing between the signal and coil driving terminals 34—35—36 and 73 respectively, at the points of connection into their respective circuits outside the casing 37. Wide spacing of the terminals greatly decreases the value of the stray capacitance between the signal and coil driving circuits and thus substantially reduces the capacitive coupling therebetween, and the casing 37 and plate 39 by reason of their grounded connection, as aforedescribed, additionally serve to shield the enclosed signal circuit elements from the effects of capacitive coupling with the coil driving circuit.

While there is shown and described herein a certain preferred embodiment of the invention, many other and varied forms and uses will present themselves to those versed in the art without departing from the spirit of the invention and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. A vibratory signal circuit interrupter for converting signals of low frequency and low potential in the circuit to relatively high frequency pulses without distorting the signal comprising, in combination, a base formed of electrical insulation material, a metallic member surrounding the periphery of said base, a metallic casing removably mounted on said base in electrical engagement with said member and having a pair of openings arranged therein in maximum spaced relation with respect to said base when the casing is mounted thereon, a metallic plate secured at right angles to said base in electrical engagement with said member and enclosed by said casing, a strip of electrical insulation material secured to one side of said plate in widely spaced parallel relation with respect to said base, a pair of terminal posts mounted on said strip and respectively extended through said openings in the casing, a pair of insulation means respectively disposed within said openings for insulating said terminal posts from said casing, a pair of terminal means releasably secured to the extended ends of said terminal posts respectively for releasably securing the casing in position on the base and for connecting the terminal posts to a relatively high frequency source of electrical energy, a pair of openings in said plate arranged therein adjacent said strip, electromagnetic switch means mounted on the other side of said plate and including a driver coil and a plurality of interrupter contacts arranged to be actuated by the coil in response to energization thereof from said source, insulated electrical connections extended through said openings in the plate for connecting terminal posts to the coil thereby to connect the coil to said source, a plurality of terminal prongs embedded in said base, and electrical conductors individual to said terminal prongs for connecting the prongs to said interrupter contacts respectively, said terminal prongs being extended outwardly of the base for connection into said signal circuit whereby the circuit is interrupted upon actuation of said contacts, said terminal posts being widely spaced and insulated from said terminal prongs at their respective points of emergence from the casing thereby to increase the resistance of the resistive paths between the coil driving circuit and said signal circuit and to decrease the capacitance of the capacitive paths therebetween, one of said terminal prongs being electrically grounded in said circuit and the interrupter contact connected thereto being grounded to said plate whereby the plate and casing are maintained at ground potential thereby to prevent electrical coupling between the driving coil circuit and said signal circuit sufficient to substantially eliminate distortion of the interrupted signal due to current leakage from the coil driving circuit to the signal circuit by way of said resistive and capacitive paths therebetween.

2. A signal circuit interrupter operable from a high frequency circuit for converting a signal of low frequency and low potential to relatively high frequency pulses without distorting the signal comprising, in combination, a metallic plate, interrupter contacts mounted on said plate, terminals for connecting said contacts into said signal circuit, one of said terminals being grounded in the signal circuit, contact actuating means including a driving coil mounted on the plate, a metallic removable cover for enclosing said interrupter contacts and contact actuating means, terminals for connecting said coil into said high frequency circuit, means for electrically connecting said cover and plate to said grounded contact terminals, and means for supporting said coil and control terminals for extension outside said cover in widely spaced and electrically insulated relation with respect to each other thereby substantially to prevent current leakage from said driving coil circuit to said signal circuit due to electrical coupling therebetween.

ERNEST. R. HABERLAND.

REFERENCES CITED

The following references are of record in the file of this patent:

UNITED STATES PATENTS

| Number | Name | Date |
|---|---|---|
| 1,578,707 | Beck | Mar. 30, 1926 |
| 1,583,792 | Niles | May 11, 1926 |
| 1,676,973 | Amsden | July 10, 1928 |
| 1,680,667 | Curtis | Aug. 14, 1928 |
| 1,943,240 | Lear et al. | Jan. 9, 1934 |
| 2,286,848 | Garstang | June 16, 1942 |
| 2,288,449 | Hanley | June 30, 1942 |
| 2,423,524 | Side | July 8, 1947 |